July 12, 1949.  G. WEISS  2,476,126
COMBINED BAIT HOLDER AND FISHHOOK
Filed Sept. 17, 1945
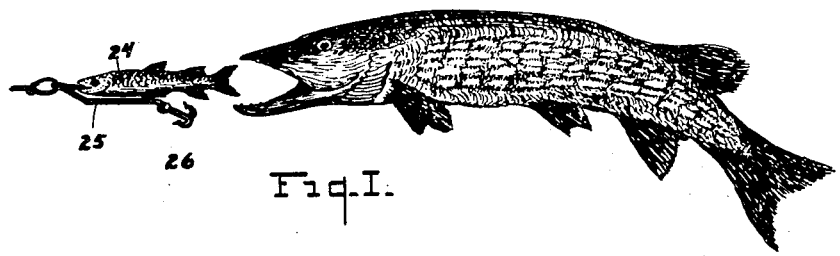
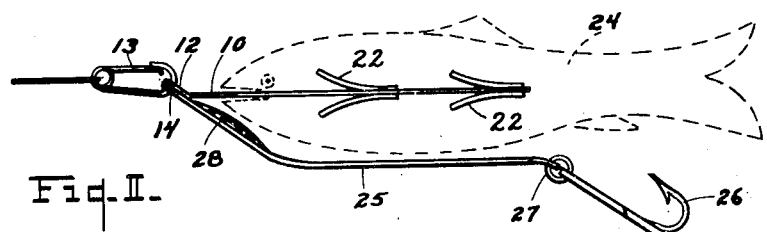 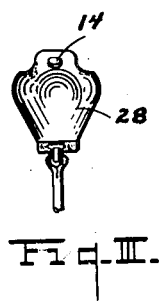
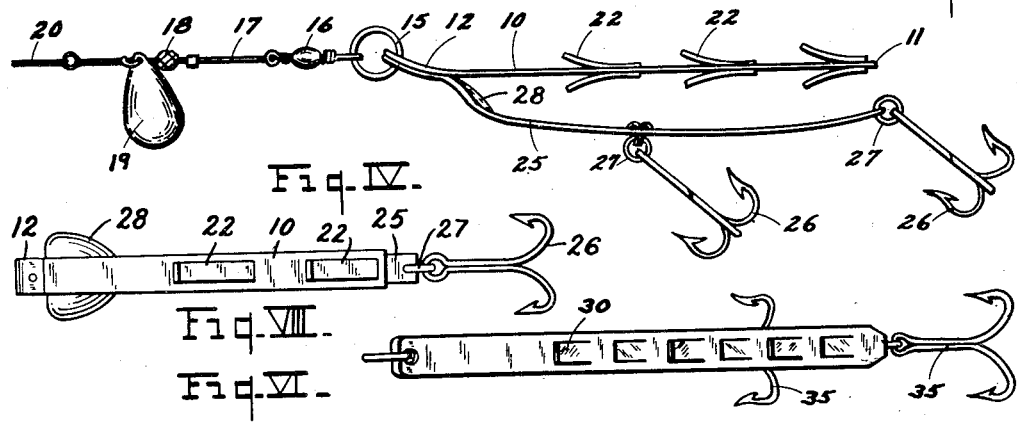
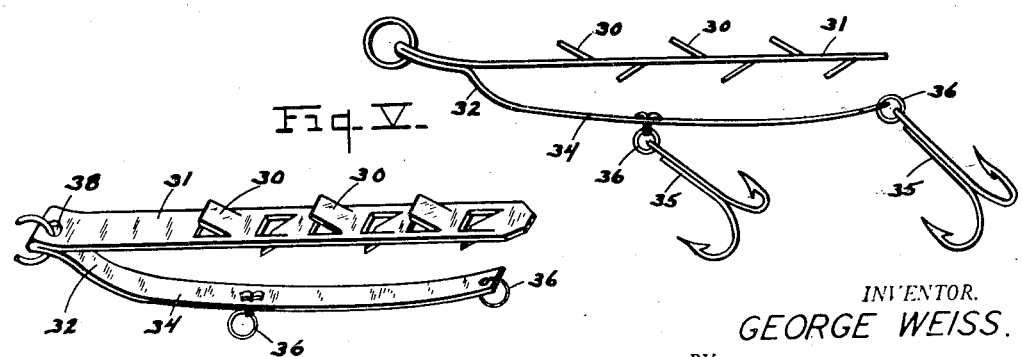
INVENTOR.
GEORGE WEISS.
BY
Joseph B. Lindecker
ATT'Y.

Patented July 12, 1949

2,476,126

UNITED STATES PATENT OFFICE 2,476,126

COMBINED BAIT HOLDER AND FISHHOOK

George Weiss, Des Plaines, Ill., assignor of one-half to Joseph B. Lindecker, Skokie, Ill.

Application September 17, 1945, Serial No. 616,729

13 Claims. (Cl. 43—44.2)

1

The present invention pertains to an improved type of fishing tackle, and is more particularly directed to a combination bait holder and fish hook.

One object of this invention is the provision of a bait retainer and fish hook of this character, which is simple and inexpensive to manufacture, efficient in its operation, and which is designed to be self-contained, so that it may be easily and securely attached to the bait, such as a minnow, so that it may be used as a casting lure especially efficient for catching northern pike, muskie, bass and pickerel.

It is also an object of this invention to provide an attachment which may be secured within the body of a minnow, without removing the line, or the spinner, or other parts associated therewith, and which will not become dislodged and lost, due to the impetus given it when casting or trolling, or when the bait becomes engaged with weeds or other obstructions.

Still another object of this invention is the provision of a minnow retainer constructed and arranged in such a manner that when it is inserted through the mouth of the minnow and within the body thereof, no additional fastening or holding devices are necessary for retaining the minnow thereon in an upright position and further the loss of the bait will be prevented.

It is a further object of this invention to provide a bait holder constructed of flat strip material and formed with the hook attaching member beneath the bait retainer member for always keeping the bait in an upright position when in the water, thus assuming the natural position of a live minnow.

Still another object of the invention is the equipping of the bait holder with an attachment such as a spinner and a bead preferably colored and having a plurality of reflecting surfaces thereon, being positioned a short distance ahead of the open mouth of the minnow, is intended to convey the idea of the minnow pursuing such an object and about to catch it, this is believed that such a sight stimulates the tendency of a larger fish to strike at the small minnow and increase the efficiency of the bait holder and fish hook combination.

Other and further important objects of this invention will be apparent from the disclosures in the specification and the accompanying drawings forming a part of the specifications.

Various arrangements of devices for holding bait of different kinds have heretofore been proposed. In many of such arrangements, the device is provided for frictionally holding the bait by gripping the outside thereof, and in some devices, an impaling needle has been provided upon which the bait, such as a minnow, was impaled by inserting the impaling needle forwardly through the rear portion of the minnow so that it would protrude out the mouth thereof, so that the line may be attached thereto. This, as well as various kinds of securing devices provided undesirable means of retaining the bait from being dislodged. These various devices have generally proven undesirable since the line must be attached to the device after it is inserted through the body of the minnow.

On the drawing:

Figure I is a diagramamtic view of the bait holder with a minnow thereon, constructed in accordance with this invention, and showing the parts of the same arranged in normal position as set for the capture of a fish.

Figure II is a side view of the fish hook and bait holder with a minnow impaled on said holder, said minnow being shown in dotted lines.

Figure III is a fragmentary front view of the bait holder, with the hook broken off, showing the concavo-convex water resistance plate.

Figure IV is a side view of the bait holder with two fish hooks attached hereto, and with a spinner and bead arranged between the bait-holder and the fish line associated with said bait-holder.

Figure V is a side view of a modified form of this invention where the holder is constructed substantially of one piece of flat strip material.

Figure VI is a top plan view of the fish hooks and bait holder shown in Figure V.

Figure VII is a perspective view of the one piece bait holder, similar to Figure V, with the fish hooks removed.

Figure VIII is a top view of the fish hook shown in Figure II.

The specific form of this improved bait-holder is preferably constructed of metal, as for example a strip of metal providing an impaling member or body 10 in the form of a longitudinal strap. One end of the body is substantially rounded as at 11 to facilitate insertion of the body 10 through the mouth and into the body of a minnow. The opposite end 12 of said body 10 is provided with an aperture 14 through which leader hook 13 or ring 15 may be attached. Said ring 15 having attached thereto, if desired, the usual swivel connection 16, connecting links 17, bead 18, preferably colored and having a plurality of reflecting surfaces thereon, a thin oval-shaped metal plate 19, having a shiny, light-reflecting surface, being preferably and also slidingly mounted on the link 17 ahead of said bead 18, and with the fish line 20 attached to the forward end of said link 17.

In the form of construction shown in Figures II and IV, the impaling body member 10 is provided with spring like members 22 soldered or otherwise secured to said body 10, said spring members extending forwardly and upwardly from the body, and normally extending outwardly far enough to engage the inside body portion of the minnow. During the insertion of the body 10, within the minnow 24, these springs engage the inner surface of the minnow's mouth and throat and by the reason of the reduced passage through the throat the springs are compressed or forced toward the body 10 of the holder but as soon as the latter is fully inserted the spring members move outwardly to the body-engaging position as shown in Figure II and IV. At the forward end 12 of said body 10 is secured, or formed from the same strip of metal as forms said body 10, a hook retaining member 25 with one or more triple hooks 26 secured thereto by rings 27 or the like.

It will be noted that the member 25 is secured below said body 10, allowing said triple hooks 26 to hang downwardly thus keeping the minnow in an upward or normal position. As the bait is drawn through the water, the water will strike the upwardly extending concavo-convex portion 28 adjacent the forward end of said body 10, and since the portion 28 is in close proximity with the head and bottom of the minnow, the water must pass below and around said portion 28 effecting a rocking movement of the bait holder and minnow. The connection members or rings 27 permit the free end of triple hooks 26 to swing, which effects a horizontal swinging movement of the tail of the minnow. Either one or both of these actions just described above produce a movement simulating a live fish. With the swivel connection 16, bead 18 and associated parts, placed ahead of said minnow, and in conjunction with the movements above described, it is intended to convey the idea of a live minnow pursuing an object and about to catch it, and it is believed that such a sight stimulates the tendency of a larger fish to strike at the small minnow and become secured or entangled with the hook or hooks 26.

In the form of construction shown in Figures V, VI, and VII, the upwardly extending barbs, or spring like members 30, similar to members 22, are stamped or struck outwardly angularly from one or both sides of the ductile metal strip forming an impaling member 31 for penetration of the minnow. The barbs are disposed on a slightly inclined plane with respect to the face of the shank or body portion 31, and project their free ends toward the forward end of the bait holder. The forward end of said shank 31 is bent downwardly and rearwardly to form the water resistance member 32 and hook retaining member 34 with hooks 35 and connecting rings 36, or the like, attached thereto. This construction forms a bait holder from one piece of ductile metal strip whereby the barbs may be formed by a cheap and economical stamping process.

After the bait holder has been inserted within the body of a minnow or similar bait, the fastener is strongly resistant to withdrawal because of the barb-like action of the barbs 30, the free edges of which engage with the flesh which they contact. The protruding head portion of the bait-holder formed of one or more layers of strip metal secured together, or bent, or folded upon itself forms a strong body portion for an aperture 38, similar to aperture 14, for the usual swivel member, associated parts and line.

The lures described are thus believed to develop in high degree the appearance and actions of a live minnow and therefore to be particularly effective in use.

It will, of course, be understood that various details of construction may be varied through a wide range without departing from the principles of this invention and it is, therefore, not the purpose to limit the patent granted thereon otherwise than necessitated by the scope of the appended claims.

I claim as my invention:

1. A bait holder comprising an impaling member formed from flat metal stock and equipped with spring members formed from flat metal stock for supporting the bait, a hook supporting member formed from flat metal stock and rigidly secured to the forward end of said impaling member, a hook carried by said hook supporting member, and a line with attaching means secured to the forward end of bait holder.

2. A bait holder comprising an impaling member formed from an elongated metal stock blank of rectilinear cross-section and equipped on opposite sides with retaining spring members formed from flat metal stock and adapted to engage the interior portions of a lure, a hook supporting member formed from flat metal stock and rigidly secured to the forward end of said impaling member and extending rearwardly in substantially parallel relation therewith, and a hook carried at the rearward end of said supporting member.

3. A bait holder comprising an impaling member formed of flat metal stock and equipped with retaining spring members formed of flat metal stock for supporting the bait, line attaching means at the forward end of said member, a hook supporting member formed of flat metal stock and rigidly secured to the forward end of said impaling member and extending rearwardly in substantially parallel relation therewith, the forward end thereof formed with a concave-convex portion comprising a water resistance member, a fish hook, and means for securing the fishhook to the rear end of said hook supporting member.

4. A bait holder comprising an impaling member formed of flat metal stock and equipped on opposite sides with retaining spring members formed of flat metal stock and adapted to be inserted through the mouth and throat of a bait to engage the interior portions of a bait for supporting the same, line attaching means at the forward end of said member, a hook supporting member rigidly secured to the forward end of said impaling member and extending rearwardly in substantially parallel relation therewith, and a fish hook secured to the hook supporting member.

5. A bait holder comprising an impaling member for supporting the bait constructed of flat ductile sheet metal, one end thereof adapted to slip through the mouth and throat and into the interior region of a bait, and remain in a flat horizontal position with regard to said bait and having a row of relatively spaced resilient barbs formed from flat stock extending upwardly and downwardly from the flat sides thereof, said barbs to withhold retraction of the impaling member from the bait, the opposite end of said member including an aperture, line attaching means at the forward end of said member and associated with said aperture, a hook supporting member formed from flat metal stock and rigidly secured to the forward end of said impaling member and extending rearwardly in substantially parallel relation therewith, and a fish hook secured to the hook supporting member.

6. A bait holder comprising an impaling member for supporting the bait constructed of flat ductile sheet metal, one end thereof adapted to slip through the mouth and throat and into the interior region of a bait and remain in a flat horizontal position with regard to said bait, and having a row of relatively spaced barbs formed of flat resilient metal stock extending upwardly and downwardly from the body of the strip from opposite flat sides thereof, providing barbs to withhold retraction of the impaling member from the bait, the opposite end of said member including an aperture, line attaching means at the forward end of said member and associated with said aperture, a hook supporting member secured to the forward end of said impaling member and extending rearwardly in substantially parallel relation therewith, and a fish hook secured to the hook supporting member.

7. A bait holder comprising an impaling member formed of flat metal stock equipped on opposite flat sides with relatively spaced barbs of rectilinear cross-section extending upwardly and downwardly and adapted to engage the interior portions of a lure in a flat horizontal position, a hook supporting member curvedly bent downwardly and rearwardly from the forward end of said impaling member and extending rigidly rearwardly in substantially parallel relation therewith, and a hook carried by said supporting member.

8. A bait holder comprising a one piece impaling member of ductile flat sheet metal and equipped on opposite sides with relatively vertically spaced resilient barbs formed from said flat metal which are adapted to engage the interior portions of a lure positioned thereon, a hook supporting member formed from flat metal stock and rigidly secured to the forward end of said impaling member and extending rearwardly in substantially parallel relation therewith, and a hook carried by said supporting member.

9. A one piece bait holder comprising an impaling member and a hook supporting member constructed from one piece of flat ductile sheet material, said impaling member having relatively spaced barbs of rectilinear cross-section, said flat, hook supporting, member having a hook secured thereto, said hook supporting member extending downwardly and rearwardly from the front end of said impaling member and held in substantially parallel relation therewith, and a hook carried at the rear end of said hook supporting member; the weight of the hook supporting member and the attached hook being sufficient to keep the bait in upright position when placed upon said impaling member.

10. A one piece bait holder comprising an impaling member and a hook supporting member constructed from one piece of flat ductile sheet material, said impaling member having relatively spaced barbs of rectilinear cross-section, said flat barbs extending from opposite sides of said flat impaling member, said flat, hook supporting, member having a hook secured thereto, said hook supporting member extending downwardly and rearwardly from the front end of said impaling member and held in substantially parallel relation therewith, and a hook carried at the rear end of said supporting member.

11. A bait holder comprising an impaling member of rectilinear cross-section having spring members of rectilinear cross-section extending from the opposite sides thereof, a hook supporting member of rectilinear cross-section secured rigidly to the forward end of said impaling member, the forward end thereof forming a water resistance plate, and a fish hook extending downwardly from said supporting member.

12. A bait holder comprising an impaling member of rectilinear cross-section and formed from flat metal stock equipped with retaining spring members of rectilinear cross-section for supporting a minnow, a line attaching means at the forward end thereof and consisting of a link with a bead simulating an edible object slidingly mounted thereon in spaced forward relation to the minnow, a hook supporting member formed from flat metal stock rigidly secured to the forward end of said impaling member and depending therefrom and extending rearwardly in substantially parallel relation therewith, the forward end thereof forming a water resistance member to produce movements simulating a live minnow when drawn through the water, a fishhook, and means securing the fishhook to the end of said hook supporting member.

13. A minnow holder comprising a one piece flat metal body section of rectilinear cross-section having an impaling member formed of flat metal stock with spring members of rectilinear cross-section for engaging a minnow, and a rigid hook supporting means formed of flat metal stock deposed beneath said member and held substantially parallel therewith for supporting a hook.

GEORGE WEISS.

REFERENCES CITED

The following references are of record in the file of this patent:

UNITED STATES PATENTS

| Number | Name | Date |
|---|---|---|
| 354,721 | McHarg | Dec. 21, 1886 |
| 1,152,698 | Bonner | Sept. 7, 1915 |
| 1,731,161 | Farley | Oct. 8, 1929 |
| 1,791,723 | Hampton | Feb. 10, 1931 |
| 2,148,074 | Kaspick | Feb. 21, 1939 |
| 2,345,197 | Hirsch et al. | Mar. 28, 1944 |

FOREIGN PATENTS

| Number | Country | Date |
|---|---|---|
| 741,382 | France | Dec. 3, 1932 |
| 21,452 | Great Britain | 1895 |
| 445,749 | Germany | June 17, 1927 |